United States Patent [19]

Duval

[11] Patent Number: 4,696,114

[45] Date of Patent: Sep. 29, 1987

[54] METHOD AND APPARATUS FOR THE DRYING OF SOLID MATERIALS BY DISPLACEMENT

[76] Inventor: Leonard A. Duval, 207 Harmon Rd., Aurora, Ohio 44202

[21] Appl. No.: 890,144

[22] PCT Filed: Oct. 10, 1984

[86] PCT No.: PCT/US84/01617
§ 371 Date: Jul. 10, 1986
§ 102(e) Date: Jul. 10, 1986

[87] PCT Pub. No.: WO86/02434
PCT Pub. Date: Apr. 24, 1986

[51] Int. Cl.$^4$ ............................................. F26B 5/16
[52] U.S. Cl. .......................................... 34/9; 134/10; 134/109
[58] Field of Search .................. 34/9, 77; 134/10, 12, 134/19, 25.1, 35, 105, 109

[56] References Cited

U.S. PATENT DOCUMENTS 4,599,807  7/1986  Wells et al. .................. 34/9

Primary Examiner—Larry I. Schwartz
Attorney, Agent, or Firm—D. Peter Hochberg

[57] ABSTRACT

An apparatus and method are disclosed for displacing a first liquid which surrounds and wets a solid, with a second liquid immiscible with the first liquid and having a substantially lower boiling point than the first liquid. The wetted solid is heated to a temperature between the boiling points of the two liquids, and the heated, wetted solid is admixed with a sufficient quantity of the second liquid to displace the first liquid from the solid, causing the second liquid to boil in the vicinity of the solid.

22 Claims, 1 Drawing Figure

METHOD AND APPARATUS FOR THE DRYING OF SOLID MATERIALS BY DISPLACEMENT

This invention relates to the separation of solid materials from a liquid wetting the materials. In particular, it relates to the economical drying of solid materials by displacement of their wetting liquid with a second wetting liquid, the drying of which is more economical than the drying of the first liquid.

In many important industrial processes, it is necessary to separate solid material, before its further processing, from a liquid phase which wets the material. Commonly, the wetting liquid is water, which presents an especially expensive problem; because the boiling point and specific and latent heats of water are relatively high, its removal is ordinarily quite energy-intensive.

Prior methods have included filtration and the application of heat to dry the particles. But where direct drying is applied, the volume of combustion gases causes particle entrainment and environmental problems. Should the surface-area-to-mass ratio be great, as with finely divided particulate matter, the high cost of energy and environmental pollution of drying becomes a significant consideration, because water constitutes a substantial proportion of the mass of the wet solids. It is to this problem especially that the invention is directed.

If the water is washed from the solids with a solvent in which it is miscible, the solvent-wetted solids may be more economical to dry, but much energy cost may reappear with the necessity of separating the water from the solvent rinse.

SUMMARY OF THE INVENTION

According to the invention herein, a first liquid wetting a solid substance is displaced entirely by a second liquid immiscible with the first and more economical to remove.

Hereinafter, the first liquid will be referred to as "water" and the second as "solvent," for convenience. It must be understood that the process is more general. The second liquid should be immiscible with the first, and of course the solid should be essentially insoluble in it.

It will of course be recognized that in general all liquids will have some solubility in each other. Thus, by the term "immiscible" it is meant that the liquids under discussion form two well-defined phases when mixed in the proportions necessary for the practice of the invention, though each will have a (usually small) proportion of the other dissolved in it. By "solvent" or "displacing liquid" a displacing liquid is meant which may contain water or the original liquid to the limits of its solubility. In most cases, as will be seen in the description to follow of the preferred embodiment, it will be most energy efficient to use a displacing liquid such that the solubility of water in it is relatively low. However for particular applications, other considerations may outweigh energy efficiency, and the use of the invention is not limited to these cases.

If the solvent is chosen to have low specific and latent heats, with a low boiling point, compared to water, its evaporation by conventional means will require much less heat input, and the energy savings in drying the solid will be substantial.

One part of the preferred embodiment of the invention is the means for achieving the displacement of water by the solvent. This displacement would otherwise be difficult, as the bond between the solid surface and water is difficult to break, particularly when the solid surface is porous. Assuming that the solid is denser than water, as is usual in industrial applications, the solvent is chosen so that its boiling point is substantially lower than that of water, but its density is greater than that of water and preferably less than that of the solid. The wet solids are heated to a temperature which is less than the boiling point of water but considerably above the boiling point of the solvent. Introduction of the heated wet solids to the solvent causes a controlled but violent boiling action that causes the water surrounding the solids to be displaced by the solvent. Then a separation of phases takes place, yielding an upper layer of solvent-saturated water (ordinarily along with some entrained solvent vapor), and a lower layer of solvent which bears the solid.

The phases are isolated from each other by any common means. The solids are concentrated mechanically from the lower solvent phase, then preferably washed by a countercurrent of pure solvent before drying.

It will ordinarily be desirable to recover as much of the solvent after use as practicable. To this end, the entrained gaseous solvent may be recovered from the upper layer by condensation. A coalescer receives the condensed upper layer, now consisting of a solvent and a water phase, as well as the supernatant solvent portions remaining from the concentration and washing of the solids. The coalesced solvent is returned to the original reaction vessel; the water may be discarded, or, if it contains appreciable dissolved solvent, the solvent may be recovered by any of the usual means known in the art.

Should the wet solid be less dense than water, the solvent should be chosen so that its density is less than that of water and greater than that of the solid. That is, in either case the density of the solvent should lie strictly between the densities of the solid and water. This will assure that after boiling and separation of the phases, the particles of the solid do not settle in the vicinity of the phase boundary.

When the method of the present invention is used, it is no longer necessary to provide the enormous heat energy necessary to heat to boiling and vaporize the water wetting the solids. The solids need only be brought to a substantially lower temperature sufficient to achieve displacement of the water by the solvent, and the removal of the solvent is then achieved relatively economically.

Accordingly, it is an object of the invention to provide a means for displacing a first liquid from the surface of solids and replacing it with another.

Another object of the invention is to provide a means for drying solids.

A further object of the invention is to provide a means which is highly effective and economical for displacing or removing liquids from particulate solids.

That these and other objects have been achieved will be seen from the claims herein, the discussion to follow of the preferred embodiment, and the drawing, in which:

FIG. 1 is a diagrammatic representation of the preferred embodiment of the invention.

DESCRIPTION OF THE PREFERRED EMBODIMENT

Figure 1:
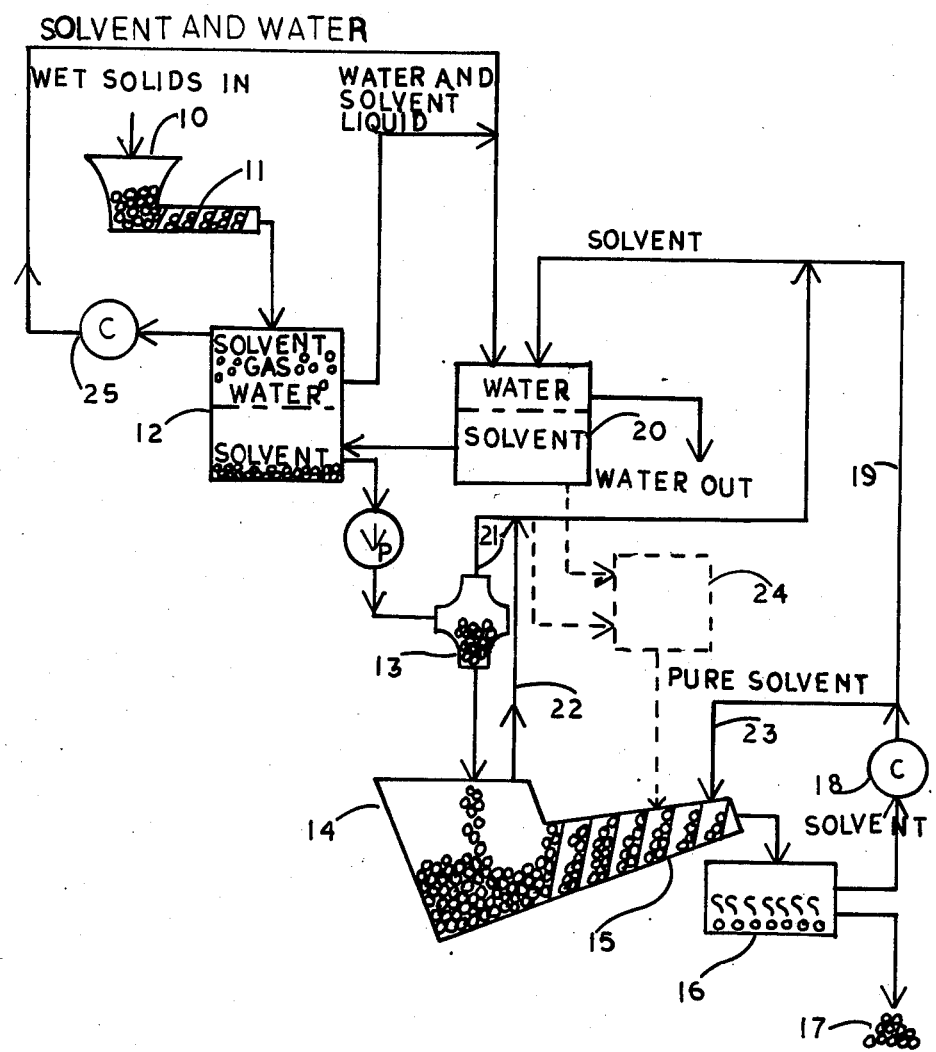

In FIG. 1 is seen the preferred embodiment of the invention, in which the solids desired to be dried are denser than the wetting liquid, shown here as water. The solvent has been chosen, according to the disclosure herein, to have a density between those of the solids and water, so that if wetted by the solvent the solids will fall to the bottom of the solvent.

The wet solids are delivered to a hopper 10, or similar structure, where they are conveyed, by means of a heated screw 11, to a reaction vessel 12. In the reaction vessel is a supply of the chosen displacing liquid, shown here denominated as "solvent", which is immiscible with water.

The temperature of the heated screw 11 is made high enough to increase the temperature of the wet solids to above the boiling point of the solvent. As a result, the contact of hot wet solids with solvent causes a boiling reaction which drives the water away from the surfaces of the solids. A separation of phases, seen at 12, occurs, with the denser solvent and solids below.

The lower layer is caused to flow, by gravity, pump or other means, to a hydracone or similar mechanical separator 13 which removes such excess solvent as can be economically separated from the solids. The now concentrated solids are collected in another hopper 14 from which they are fed to a dehydrating screw 15. This serves to further concentrate the solids by removing excess solvent. Meanwhile, solvent from hydracone 13 flows into a conduit as explained below.

Finally, the solids wetted by the solvent are transferred to a dryer 16. The particular drying technique will depend upon the solids and solvent and will be chosen according to considerations known to those skilled in the art. (See, e.g., van't Land, C. M., *Chem Eng.*, Mar. 5, 1984). The result of drying will be the desired dried solids 17 and vapor of the solvent.

In the preferred embodiment the solvent vapors are delivered to a condenser 18, which condenses them to liquid form. If desired, they may be substantially condensed from any included water vapor, in any of various well known manners. After condensation to liquid, the solvent, or solvent and water, is transferred via a conduit 19 to a coalescer 20, the function of which is to provide a location for recovered liquid solvent to coalesce before being recycled into the reaction vessel 12. The coalescer 20 also receives supernatants of solvent from the hydracone 13, screw 15, and reaction vessel 12 through conduction means 21 and 22.

It may be preferred to rinse the concentrated solids in dehydrating screw 15 with relatively pure solvent, that is, solvent with no dissolved water, in order to dry the solids more economically. A convenient way of doing this is seen in FIG. 1. Pure solvent is fed to the upper end of the dehydrating screw 15 and it proceeds downward in a "countercurrent distribution", a highly efficient rinsing technique. As a result, the solids emerging into the dryer 16 contain essentially no water. The emergent solvent vapor is thus simply condensed at 18 to essentially pure solvent for recycling, through conduit 23, to the dehydrating screw 16. Should the contribution of pure solvent from condenser 18 not be sufficient, a supplementary source, purified from the wet solvent from another portion of the system, as shown in phantom at 24, may be employed.

Meanwhile, at reaction vessel 12, the upper phase, containing water and any water and/or solvent vapor, is delivered to a condenser 25 which condenses the vapor. The mixture is then transmitted to coalescer 20, so that the water may be removed and the solvent recovered for reuse.

Throughout this embodiment, it will be understood by those skilled in the art that pumps, valves, and the like are employed wherever necessary according to well known engineering considerations. They do not form a part of the invention, and are not diagrammed.

For the case in which the solid is less dense than water, the solvent is again chosen with intermediate density. The phase separation in the reaction vessel is reversed. Separation and concentration by gravity is still used; the piping and other modifications will be obvious to those skilled in the art.

EXAMPLE

The energy savings in drying 100 pounds of wet finely particulate iron, using methylene chloride with the method of the present invention, may be approximated by the following calculations (transmission and mixing energy requirements, and the differential in the densities of water and methylene chloride will be neglected):

Specific heat of iron=0.117 BTU/lb/deg.F.
Specific heat of water=1.000 BTU/lb/deg.F.
Specific heat of $CH_2Cl_2$=0.280 BTU/lb/deg.F.
Latent heat of water=972 BTU/lb.
Latent heat of $CH_2Cl_2$=142 BTU/lb
Boiling point of $CH_2Cl_2$=104 deg. F.

Assume an ambient temperature of 70° F., and a wetted solids preheat temperature of 120° F. Further, assume that the wetted solids contain 75 pounds of particulate iron and 25 pounds of water, originally, and 25 pounds of solvent when they enter the dryer 16.

Then the heat required to dry the iron conventionally is:

$$[(25 \text{ lb.} \times 1.000 \text{ BTU/lb/deg}) + (75 \text{ lb.} \times 0.117 \text{ BTU/lb/deg})] \times (212 - 70) \text{ deg} + 25 \text{ lb.} \times 972 \text{ BTU/lb} = 29{,}096 \text{ BTU}$$

The heat required to dry the iron using the present invention, however, is $$[(25 \text{ lb.} \times 1.000 \text{ BTU/lb/deg}) + (75 \text{ lb.} \times 0.117 \text{ BTU/lb/deg})] \times (120 - 70) \text{ deg} +$$
$$[(25 \text{ lb.} \times .280 \text{ BTU/lb/deg}) + (75 \text{ lb.} \times 0.117 \text{ BTU/lb/deg})] \times (104 - 70) \text{ deg} +$$
$$25 \text{ lb.} \times 142 \text{ BTU/lb} =$$
$$5565 \text{ BTU, a savings of } 23{,}531 \text{ BTU, or } 81\%.$$

This calculation does not consider energy which may be needed to purify solvent for countercurrent distribution in the dehydrating screw. However such amounts should be small since relatively little pure solvent is required.

Even if the countercurrent washing step is omitted, the energy savings would still be great: The solubility of water in $CH_2Cl_2$ is 0.2%, which amounts to 0.05 lb. water in 25 lb. $CH_2Cl_2$. The additional energy needed would thus be about (0.05 lb×0.1,000 BTU/lb/deg) (212−70) deg+(75 lb.×0.117 BTU/lb/deg) (212−104) deg+0.05 lb.×972 BTU/lb=1004 BTU. At 6569 BTU for the process, the savings are 22,577 BTU, or 77%.

The invention has been described in detail with particular reference to the preferred embodiment, but it should be understood that variations and modifications within the spirit and scope of the invention may occur to those skilled in the art to which the invention pertains.

I claim:

1. A method for displacing a first liquid, said first liquid surrounding and wetting finely divided particulate matter, by a second liquid immiscible with said first liquid and having a substantially lower boiling point than said first liquid, said method comprising heating said wetted finely divided particulate matter to a temperature between the boiling points of said first liquid and of said second liquid; and admixing said heated wetted finely divided particulate matter with a sufficient quantity of said second liquid to displace said first liquid from said finely divided particulate matter, causing said second liquid to boil in the vicinity of said finely divided particulate matter.

2. A method for separating finely divided particulate matter wetted with a first liquid, from first liquid, said method comprising, selecting a displacing liquid immiscible with said first liquid and having a boiling point substantially less than that of said first liquid;

heating said finely divided particulate matter wetted with said first liquid to a temperature greater than the boiling point of said displacing liquid but less than the boiling point of said first liquid;

admixing said heated solids wetted by said first liquid with a quantity of said displacing liquid sufficient to cause said displacing liquid to substantially displace said first liquid, so that said finely divided particulate matter is wetted by and contained in said displacing liquid, and said first liquid, is present in a separate phase;

separating said displacing liquid and finely divided particulate matter contained therein from said separate phase; and drying said displacing liquid from said finely divided particulate matter.

3. The method of claim 2, and further comprising the step, between said separating and drying steps of removing a first part of said displacing liquid from said finely divided particulate matter contained therein, leaving a second part of said displacing liquid wetting said finely divided particulate matter.

4. The method of of claim 2 and further comprising the step of subjecting said displacing liquid, and solids wetted thereby, to a counter-current flow of essentially pure displacing liquid, after said separating step and prior to said drying step.

5. The method of claim 3 and further comprising the step of subjecting said second part of said displacing liquid, and solids wetted thereby, to a counter-current flow of essentially pure displacing liquid, after said removing step and prior to sdid drying step.

6. The method of claim 2, wherein said drying results in the release of vapors of said displacing liquid, and further comprising the step of condensing said vapors to obtain a condensate of displacing liquid.

7. The method of claim 6 and further comprising the step of adding at least a portion of said condensate of displacing liquid to said displacing liquid, and solids wetted thereby, after said separating step and prior to said drying step.

8. The method of claim 6 and further comprising the step of adding at least a portion of said condensate of displacing liquid to said quantity of said displacing liquid of said admixing step.

9. The method of claim 3 and further comprising the step of adding the said first part of said displacing liquid removed in said separating step, to the said quantity of said displacing liquid of said admixing step.

10. The method of claim 2 and further comprising the step of subjecting the said separate phase of said admixing step to condensation of vapors entrained therein.

11. The method of claim 3 and further comprising the step of subjecting the said separate phase of said admixing step to condensation of vapors entrained therein.

12. The method of claim 2 and further comprising the step of condensing any vapors resulting from said drying step.

13. The method of claim 3 and further comprising the step of condensing vapors resulting from said drying step.

14. The method of claim 10 and further comprising the steps of condensing any vapors resulting from said drying, and coalescing said condensed separate phase of said admixing step with said condensed vapors resulting from said drying step.

15. The method of claim 11 and further comprising the step of coalescing said condensed separate phase of admixing step with said first part of said displacing liquid derived from said separating step.

16. The method of claim 13 and further comprising the step of coalescing said condensed vapors resulting from the drying of said finely divided particulate matter in said drying step with said first part of said displacing liquid derived from said separating step.

17. Apparatus for the removal of a first liquid from finely divided particulate matter wetted by said first liquid comprising heating means to heat said wetted finely divided particulate matter to a temperature less than the boiling point of said first liquid but greater than the boiling point of a second liquid, said second liquid being immiscible with said first liquid and having a density lying between the densities of said first liquid and of said finely divided particulate matter;

reaction means for combining said heated wet finely divided particulate matter with a sufficient volume of said second liquid to cause said second liquid to boil and to displace the water from said finely divided particulate matter, whereby said finely divided particulate matter becomes wetted with said second liquid and separated from said first liquid;

conduit means for conveying said heated wet finely divided particulate matter from said heating means to said reaction means; and separation means for separating said second liquid and said finely divided particulate matter wetted therein from said first liquid.

18. Apparatus for the removal of liquids from finely divided particulate matter wetted by a first liquid, comprising the apparatus of claim 17 and further comprising drying means for removing said second liquid from said finely divided particulate matter wetted therein.

19. The apparatus of claim 18, and in which said drying means comprises concentration means for mechanically removing a first portion of said second liquid from said second liquid wetting said finely divided particulate matter, leaving a second portion of said second liquid wetting said finely divided particulate matter, and heating means for drying said second portion of said second liquid from said finely divided particulate matter.

20. The apparatus of claim 18 and further comprising coalescing means for combining together quantities of said second liquid removed by said drying means.

21. The apparatus of claim 17 and further comprising first liquid condensing means for condensing into liquid form gases contained in said first liquid after its said separation from said second liquid and finely divided particulate matter wetted therein.

22. The apparatus of claim 18 and further comprising second liquid condensing means for condensing into liquid form vapors of said second liquid resulting from the use of said drying means.

* * * * *